US012646725B2

(12) United States Patent (10) Patent No.: US 12,646,725 B2
Gretzer et al. (45) Date of Patent: Jun. 2, 2026

(54) BIPOLAR PLATE WITH MEDIA REGULATION AND FUEL CELL STACK

(71) Applicant: AUDI AG, Ingolstadt (DE)

(72) Inventors: Markus Gretzer, Eichstätt (DE);
Norbert Kluy, Schönfeld (DE)

(73) Assignee: AUDI AG, Ingolstadt (DE)

( * ) Notice: Subject to any disclaimer, the term of this patent is extended or adjusted under 35 U.S.C. 154(b) by 482 days.

(21) Appl. No.: 18/029,321

(22) PCT Filed: Oct. 25, 2021

(86) PCT No.: PCT/EP2021/079498
§ 371 (c)(1),
(2) Date: Mar. 29, 2023

(87) PCT Pub. No.: WO2022/090133
PCT Pub. Date: May 5, 2022

(65) Prior Publication Data
US 2023/0378486 A1     Nov. 23, 2023

(30) Foreign Application Priority Data

Oct. 30, 2020     (DE) ..................... 10 2020 128 564.7

(51) Int. Cl.
*H01M 4/68*          (2006.01)
*H01M 8/0247*      (2016.01)
(Continued)

(52) U.S. Cl.
CPC ....... *H01M 8/0267* (2013.01); *H01M 8/0247* (2013.01); *H01M 8/0265* (2013.01); *H01M 8/241* (2013.01)

(58) Field of Classification Search
CPC ............. H01M 8/0267; H01M 8/0247; H01M 8/0265; H01M 8/241; H01M 8/04104;
(Continued)

(56) References Cited

U.S. PATENT DOCUMENTS

2003/0077501 A1      4/2003   Knights et al.
2008/0292938 A1*   11/2008   Perry ................ H01M 8/04089
429/514

FOREIGN PATENT DOCUMENTS

CN          109075357 A     12/2018
CN          110214392 A     9/2019
(Continued)

OTHER PUBLICATIONS

International Preliminary Report on Patentability, dated May 2, 2023, for International Patent Application No. PCT/EP2021/ 079498. (7 pages).
(Continued)

*Primary Examiner* — Christian Roldan
(74) *Attorney, Agent, or Firm* — Seed Intellectual Property Law Group LLP

(57) ABSTRACT

A bipolar plate for a fuel cell is provided having an active region and a marginal region surrounding the active region, and having a first media guide having a first passage and a second media guide having a second passage, and having a media duct extending through the active region and fluidically connecting the first passage to the second passage, wherein the first passage and/or the second passage is associated with a diaphragm, which is adjustable by an actuator to establish or to regulate the flow cross section of the first passage and/or of the second passage. A fuel cell stack having a fuel cell with such a bipolar plate is also provided.

9 Claims, 3 Drawing Sheets

(51) Int. Cl.
    *H01M 8/0265*      (2016.01)
    *H01M 8/0267*      (2016.01)
    *H01M 8/241*       (2016.01)

(58) Field of Classification Search
    CPC ............. H01M 8/043; H01M 8/04753; H01M
                8/04761; H01M 8/04768; Y02E 60/50
    USPC ........................................................ 429/457
    See application file for complete search history.

(56) References Cited

FOREIGN PATENT DOCUMENTS

| | | | | |
|---|---|---|---|---|
| DE | 19905564 | C2 | 6/2001 | |
| DE | 102004044494 | A1 * | 3/2006 | .......... H01M 8/0265 |
| DE | 102010023566 | A1 | 12/2011 | |
| DE | 102011120542 | A1 | 6/2013 | |
| DE | 102015015229 | A1 | 6/2016 | |
| DE | 102017201540 | A1 | 8/2018 | |
| DE | 102017202705 | A1 | 8/2018 | |
| DE | 102017210263 | A1 | 12/2018 | |
| DE | 202019101145 | U1 | 5/2020 | |
| EP | 1511102 | A2 | 3/2005 | |

OTHER PUBLICATIONS

International Search Report, mailed Jan. 20, 2022, for International
Patent Application No. PCT/EP2021/079498. (2 pages).

* cited by examiner

BIPOLAR PLATE WITH MEDIA REGULATION AND FUEL CELL STACK

BACKGROUND

Technical Field

The present disclosure relates to a bipolar plate for a fuel cell, as well as a fuel cell stack.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, such as hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other and electrically insulates them, a transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water.

The reactant gases are supplied to the electrodes of the fuel cells using bipolar plates. In addition to the reactant gases, a cooling medium is also taken through the bipolar plates, so that three different media are taken through the bipolar plates in the smallest of spaces.

In order to meet performance demands, multiple fuel cells are put together and stacked one on another to form a fuel cell stack. The media guide described herein can be configured as media ports formed as recesses in the marginal region, which when the individual layers of the fuel cell stack are stacked on each other produce multiple three-dimensional spaces. Alternatively, the media guide can also be formed as a functional component associated with the marginal region of the bipolar plates and the fuel cells and formed separately from them, in which a three-dimensional space is formed. In other words, an external header can be associated with the stacked fuel cells and bipolar plates. Thus, multiple three-dimensional spaces are formed along the stacking direction for supplying the reactant and the cooling medium into the active region of the fuel cells and multiple three-dimensional spaces are formed along the stacking direction to carry away the reactant and the products, as well as the cooling medium. The active region of the bipolar plate typically forms a duct structure of media ducts, which fluidically connects one of the media guides, such as a media port, to another of the media guides. In the bipolar plate body of the bipolar plate, there is realized at least one passage which fluidically connects the media guide, such as the media port, to the media duct or ducts.

The efficiency of the fuel cell is influenced by the media mass flow through the media ducts. This is in large measure established with the choice of the flow cross section, i.e., the diameter of the passages, during the fabrication of the bipolar plate. The choice of the diameter represents a compromise among various requirements for the humidification and the power production. This makes difficult a rapid adapting of the power profile of the fuel cell stack during its operation.

The document DE 20 2019 101 145 U1 describes a separator plate having a duct system and the individual fluid paths of which have different cross sections.

The document DE 10 2017 202 705 A1 describes a separator plate for a fuel cell stack in the media port of which there is installed and secured a distribution element for adapting the flow cross section of the passages. The document DE 10 2017 201 540 A1 describes a fuel cell stack having a media duct for the supplying or removal of a cooling fluid, the flow rate of the cooling fluid being controllable using a servo element with an actuator arranged inside the media duct.

BRIEF SUMMARY

Embodiments of the disclosure provide a bipolar plate and a fuel cell stack with a dynamic media guide.

For instance, a bipolar plate for a fuel cell is provided having an active region and a marginal region surrounding the active region, being associated with a first media guide having a first passage and a second media guide having a second passage, and having a media duct extending through the active region and fluidically connecting the first passage to the second passage, wherein the first passage and/or the second passage is associated with a diaphragm, which is adjustable using an actuator to establish or to regulate the flow cross section of the first passage and/or of the second passage. The diaphragm, adjustable by the actuator, enables a dynamic establishing of the flow cross section at the first passage and/or at the second passage, which in turn regulates the mass flows in the media duct as needed. The diaphragm may be adjustable between a first position, in which the passage is at least partly closed, and consequently the flow cross section is reduced, and a second position, in which the passage is opened. The diaphragm can also be moved by the actuator such that the passage is entirely closed by the diaphragm, so that a media mass flow through the passage into the media duct is prevented. This rapid reduction in the media supply means that only the media still inside the active region will be available for the electrochemical reaction. This allows a rapid decreasing of the electrical power production of the fuel cell stack in order to respond to dynamic processes in vehicles, such as the engaging of an antilock brake system. Conversely, a rapid power increase can also be realized, or the media guide can be adapted to the power demand such that the media consumption is optimized. By associating a diaphragm controlled by the actuator with the second passage, it is also possible to dynamically control the moisture budget of the fuel cell stack.

The diaphragm may be arranged in front of the passage or in the passage. The diaphragm in this case can have the same cross sectional shape as the first passage and/or the second passage, and it may be advantageous for the diaphragm to be elliptical. This enables a simple fabrication and a good closure of the passage.

In an alternative embodiment, it is possible for the cross sectional shape of the diaphragm to be a polygon, i.e., rectangular, square, hexagonal, orthogonal or triangular in shape. Furthermore, the diaphragm can also be curved in the direction of the passage or contrary to the passage.

In some embodiments, moving the diaphragm using the actuator is for the diaphragm to be mounted rotatably at or in the first passage and/or for the diaphragm to be mounted rotatably at or in the second passage.

In an alternative embodiment, the diaphragm is mounted movably on or in the first passage and/or mounted movably on or in the second passage. This allows an easy adjusting of the diaphragm by the actuator and an easy fabrication of the bipolar plate.

In order to supply and dynamically regulate the entire active region with the media or medium, the first media guide may have a plurality of first passages and the second media guide may have a plurality of second passages, for the first passages to be fluidically joined together with the second passages by media ducts running through the active region, and for at least two of the first passages and/or for at least two of the second passages to each be associated with a diaphragm, adjustable using the actuator, for adapting the flow cross section of the passages. Each of the first passages and/or each of the second passages may be associated with a diaphragm movable by the actuator for adapting the flow cross section of the passages.

In this context, the diaphragms are individually adjustable using the actuator. This makes possible a targeted control of the media supply and/or media removal in different partial regions of the active region. In some embodiments, it is also possible for the diaphragms to be movable jointly by the actuator.

In order to make possible an easier fabrication of the bipolar plate, the plurality of the diaphragms may form a comb with comb teeth and recesses arranged between the comb teeth, or for the plurality of the diaphragms to form a lattice structure with lattice walls and lattice recesses arranged between the lattice walls. When the comb is moved using the actuator, the passages can be at least partly closed by the comb teeth. This holds equally for a design of the diaphragms as a lattice. When the lattice is moved using the actuator, the passages can be at least partly closed by the lattice walls.

The fuel cell stack is characterized in that a plurality of fuel cells stacked one on another in a stacking direction is provided, having at least one bipolar plate and a membrane electrode assembly. The stacking of the fuel cells and the bipolar plates forms a media space extending in the stacking direction. Thanks to the integration of the bipolar plate in the fuel cell stack, a dynamic control of the media flow through the media guide into the active region of the fuel cell is possible. This permits a rapid decreasing or increasing of the electric power offering of the fuel cell stack, a dynamic regulation of the water budget, and a targeted control of the cooling of the fuel cell stack. In particular, it may be advantageous for the diaphragm associated with the at least one of the passages to be mounted movably in or against the stacking direction, which enables a dynamic adapting of the flow cross section of the passages and thus a dynamic adapting of the media mass flow. The benefits and embodiments described for the bipolar plate hold accordingly for the fuel cell stack having at least one bipolar plate.

The features and combinations of features mentioned above in the description, as well as the features and combinations of features mentioned below in the description of the figures and/or shown solely in the figures, can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the disclosure.

BRIEF DESCRIPTION OF THE SEVERAL VIEWS OF THE DRAWINGS

Further benefits, features, and details will emerge from the claims, the following description of embodiments, and the drawings.

DETAILED DESCRIPTION

Figure 1:
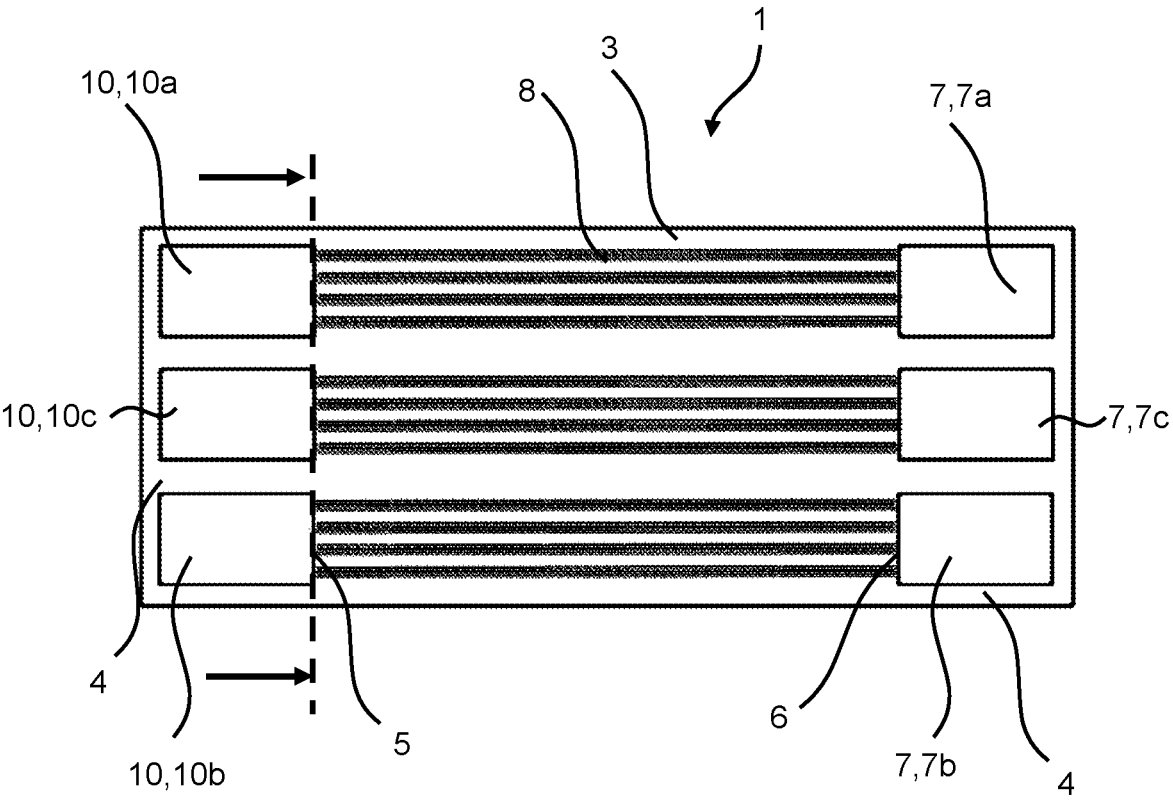
FIG. 1 shows a schematic representation of the bipolar plate.

FIG. 1 shows a bipolar plate 1 for a fuel cell having an active region 3 and a marginal region 4 surrounding the active region 3. The marginal region 4 has three first media guides 10 formed as first media ports, namely, a media port 10a for supplying the first reactant, a media port 10b for supplying the second reactant and a media port 10c for supplying the coolant to the active region 3 of the bipolar plate 1. Furthermore, three second media guides 7 are present, formed as second media ports, namely a media port 7a for removal of the first reactant, a media port 7b for removal of the second reactant, and a media port 7c for removal of the coolant. Between the first media guide 10 and the second media guide 7 there are media ducts 8 extending over the active region 3, forming a respective flow field for the particular operating medium.

The first media guides 10 have a plurality of first passages 5. The second media guides 7 have multiple second passages 6. Furthermore, a plurality of media ducts 8 are formed and run through the active region 3 of the bipolar plate 1. The media ducts 8 fluidically connect the first passages 5 of the first media guides 10 to the second passages 6 of the respective second media guides 7. The media ducts 8 are shown simplified in FIG. 1. Thus, the media ducts 8 may be formed as a media duct network, which may run meandering through the active region 3 of the bipolar plate 1. In particular, the media ducts 8 run open on one side, in order to supply the media to the active regions of the layers adjacent to the bipolar plate 1. The first passages 5 and the second passages 6 are formed inside a bipolar plate body 15, so that the passages 5, 6 tunnel under the bipolar plate 1.

Figure 2:
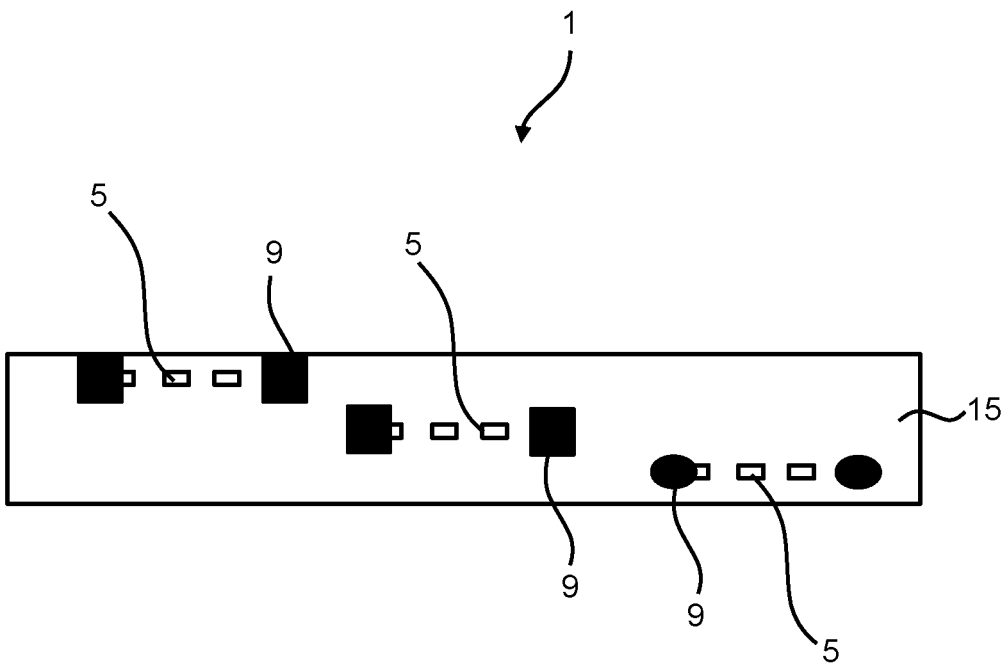
FIG. 2 shows a schematic sectional view of the bipolar plate.

FIG. 2 shows that the first passages 5 are associated with a diaphragm 9, which can be moved, in particular pushed, using an actuator, not shown, to establish or regulate the flow cross section of the first passage 5. This makes it possible to dynamically control the media guide or the media mass flow through the bipolar plate 1. For ease of drawing, not every one of the first passages 5 is associated with a diaphragm 9. In some embodiments, however, each of the first passages 5 and each of the second passages 6 is associated with a diaphragm 9. The diaphragms 9 may have an elliptical, circular, or polygonal cross sectional shape.

The diaphragm 9 may be mounted movably at or in the passage 5, 6, so that a pushing of the diaphragm 9 by the actuator results in a changing of the flow cross section of the passage 5, 6. The diaphragm 9 can be arranged in front of the passage 5, 6 or in the passage 5, 6. Furthermore, the diaphragm 9 can also be configured to be pushed through or installed in the passage 5, 6. The passages 5, 6 can be formed as simple passage openings or as a passage duct.

Alternatively, the flow cross section of the passages 5, 6 can also be changed by a rotatable mounting of the diaphragm 9 on or in the passages 5, 6.

Figure 3:
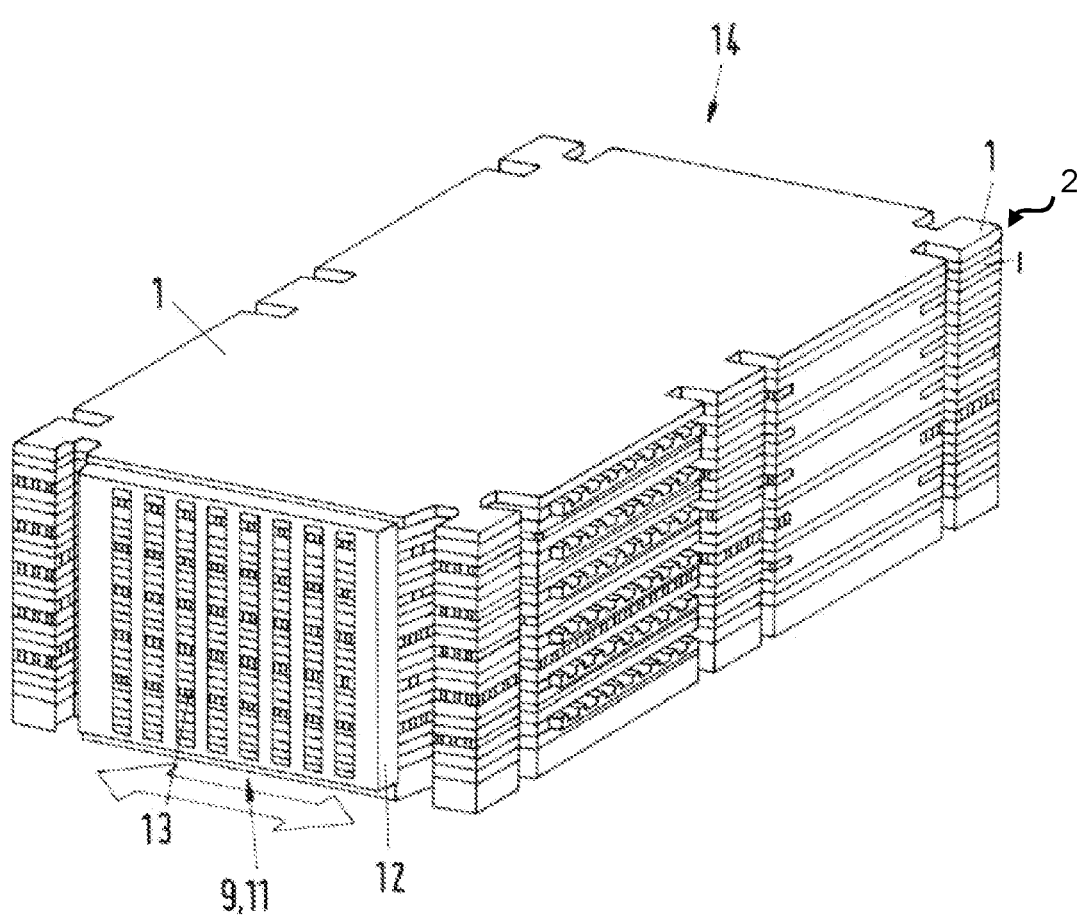
FIG. 3 shows a schematic representation of the fuel cell stack.

The bipolar plate 1 described in FIGS. 1 and 2 can be integrated in a fuel cell stack 14 having many fuel cells 2 stacked one on another in a stacking direction stack. This is shown as an example in FIG. 3. For this, between every two such bipolar plates 1 there is placed a membrane electrode assembly, in order to supply them with the reactant through the flow fields of the bipolar plates 1. This stacking produces a media space extending substantially parallel to the stacking direction. Through these media guides, the reactant and the coolant are taken to the fuel cells 2. In the present instance, the diaphragms 9 of the bipolar plate are formed as a comb 11 having comb teeth 12 and recesses 13 arranged between the comb teeth 12. This plurality of diaphragms 9, formed as a comb 11, can be moved using the actuator. In order to reduce the flow cross section of the passages 5, 6, the comb teeth 12 can at least partly close the passages 5,6. On the other hand, if the recesses 13 are situated in front of the passages 5, 6, the passages are not closed and the media mass flow can move unhindered into or through the passages 5, 6 into the media ducts 8, and hence into the particular flow field. This enables a dynamic control of the media in the bipolar plate 1 and thus in the fuel cell stack 14. It will be noticed that the fuel cell stack 14 shown can be supplemented with external headers, so that the diaphragm 9 is introduced into the axially extending media space created by them.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell system, comprising:
 a bipolar plate having an active region and a marginal region surrounding the active region, and the bipolar plate comprising:
  a first media guide having a plurality of first passages;

a second media guide having a plurality of second passages; and
  a plurality of media ducts extending through the active region and fluidically connecting the plurality of first passages to the plurality of second passages;
 an actuator; and
 a respective diaphragm associated with each of at least two of the plurality of first passages or with each of at least two of the plurality of second passages, wherein each diaphragm is adjustable by the actuator or another actuator to dynamically change a respective flow cross section of the at least two of the plurality of first passages or the at least two of the plurality of second passages during operation of the fuel cell system.

2. The fuel cell system according to claim 1, wherein each diaphragm is elliptical.

3. The fuel cell system according to claim 1, wherein a cross sectional shape of each diaphragm is a polygon.

4. The fuel cell system according to claim 1, wherein each diaphragm is mounted rotatably at or in a respective one of the plurality of first passages or each diaphragm is mounted rotatably at or in a respective one of the plurality of second passages.

5. The fuel cell system according to claim 1, wherein each diaphragm is mounted movably on or in a respective one of the plurality of first passages or each diaphragm is mounted movably on or in a respective one of the plurality of second passages.

6. The fuel cell system according to claim 1, wherein the diaphragms are individually adjustable by a respective actuator.

7. The fuel cell system according to claim 1, wherein the diaphragms form a comb with comb teeth and recesses arranged between the comb teeth.

8. The fuel cell system according to claim 1, wherein the diaphragms form a lattice structure with lattice walls and lattice recesses arranged between the lattice walls.

9. The fuel cell system according to claim 1, comprising a stack formed from a plurality of fuel cells stacked one on another in a stacking direction, each fuel cell comprising:
 at least one bipolar plate; and
 a membrane electrode assembly.

* * * * *